United States Patent
Elias et al.

(10) Patent No.: US 10,346,310 B2
(45) Date of Patent: Jul. 9, 2019

(54) CACHE BLOCK APPARATUS AND METHODS

(71) Applicant: Red Hat, Inc., Raleigh, NC (US)

(72) Inventors: Filip Elias, Vysni Lhoty (CZ); Filip Nguyen, Brno-Reckovice a Mokra Hora (CZ)

(73) Assignee: Red Hat, Inc., Raleigh, NC (US)

( * ) Notice: Subject to any disclaimer, the term of this patent is extended or adjusted under 35 U.S.C. 154(b) by 470 days.

(21) Appl. No.: 15/055,033

(22) Filed: Feb. 26, 2016

(65) Prior Publication Data

US 2017/0249252 A1  Aug. 31, 2017

(51) Int. Cl.
*G06F 12/0864* (2016.01)

(52) U.S. Cl.
CPC ...... *G06F 12/0864* (2013.01); *G06F 2212/60* (2013.01)

(58) Field of Classification Search
CPC .............. G06F 12/0864; G06F 2212/60
USPC ...................................................... 717/151
See application file for complete search history.

(56) References Cited

U.S. PATENT DOCUMENTS

| | | | | |
|---|---|---|---|---|
| 8,769,518 | B1 * | 7/2014 | Daudel | G06F 9/455 717/166 |
| 9,588,788 | B1 * | 3/2017 | Ramalingam | G06F 9/45558 |
| 2005/0102657 | A1 * | 5/2005 | Lewis | G06F 9/45516 717/140 |
| 2006/0059252 | A1 * | 3/2006 | Tatsubori | G06F 21/6218 709/223 |
| 2009/0204963 | A1 * | 8/2009 | Swart | G06F 9/44594 718/1 |
| 2010/0229159 | A1 * | 9/2010 | Odaira | G06F 8/24 717/128 |
| 2012/0210299 | A1 * | 8/2012 | Pasternak | G06F 9/4493 717/115 |
| 2015/0121013 | A1 * | 4/2015 | Chiang | G06F 17/30902 711/133 |

OTHER PUBLICATIONS

Apache Commons™ Java Caching System; Last Published Apr. 14, 2015 (4 pages) https://commons.apache.org/proper/commons-jcs/.

(Continued)

*Primary Examiner* — Emerson C Puente
*Assistant Examiner* — Sen Thong Chen
(74) *Attorney, Agent, or Firm* — K&L Gates LLP (57) ABSTRACT

A method and apparatus for creating and using cached blocks of bytecode are disclosed. An example apparatus includes a virtual machine execution engine configured to load an input variable value in conjunction with starting execution of bytecode associated with an application. The execution engine is also configured to read a cache table entry stored in a class file related to the application. The cache table entry includes a demarcation of a selected portion of the bytecode of the application that is stored within a cache block, a cache block input variable, and a cache block output variable. The execution engine is further configured to compare the loaded input variable value to the cache block input variable. Responsive to the input variable value matching the cache block input variable, the execution engine is configured to skip execution of the selected portion of the bytecode and read the cache block output variable.

20 Claims, 6 Drawing Sheets

(56) References Cited

OTHER PUBLICATIONS

Oracle® Application Server Containers for J2EE Services Guide 10g Release 2 (10.1.2) for Windows or UNIX (32 pages), retrieved on Mar. 15, 2016 https://docs.oracle.com/cd/B14099_19/web.1012/b14012/objcache.htm.

* cited by examiner

| IDENTIFIER | DEMARCATION FROM | DEMARCATION TO | INPUT(S) | OUTPUT(S) |
|---|---|---|---|---|
| block_23 | 45 | 83 | pattern - value 1 | counter - value 1, status.isSucessful |
| block_23 | 45 | 83 | pattern - value 2 | counter - value 2, status.isSucessful |
| block_23 | 45 | 83 | pattern - value 3 | counter - value 3, status.isSucessful |
| block_23 | 45 | 83 | pattern - value 4 | counter - value 4 status.isSucessful |
| block_23 | 45 | 83 | pattern - value 5 | counter - value 5, status.isSucessful |
| block_23 | 45 | 83 | pattern - value 6 | counter - value 6, status.isSucessful |
| .... | | | | |
| block_50 | 102 | 139 | object - hash 1, primitive - value 1 | object 2 - object field value 1 |
| block_50 | 102 | 139 | object - hash 1, primitive - value 2 | object 2 - object field value 2 |

FIG. 3

```
Class Test{
private ResultObject status=new ResultObject();
...
1,Pattern pattern = Pattern.compile("a*b[^egh]d+[0-9]*");  //we are in some method
2,int counter2;
3,Counter counter=new Counter();
4,cached(pattern) {
5,  int index=0;
6,  while(counter<counter2){   //counter2 = 100,000 - a very time consuming task
7,    Matcher m = p.matcher(getNode(counter)); //finds matches for the reg exp
8,    boolean value = m.matches();
9,    if(value==true){
10,       counter.value++;
11,       status.isSuccessful=true;
12,   }
13, }
14,}
...
```

CACHE BLOCK APPARATUS AND METHODS

BACKGROUND

Known computer programming languages enable certain data or objects to be stored in a cache memory. For example, the Java™ programming language provides a caching system that enables data related to a Java™ application to be stored to a cache memory rather than a database. The Java™ programming language also includes an object cache that enables frequently accessed objects to be stored to cache. Storing data or objects to cache enables the data or objects to be accessed relatively quicker than accessing the data or objects in a database or regular random access memory ("RAM"). Further, storing data or objects to cache also saves computer processing by eliminating the need to repeatedly create and load information within a Java™ application.

SUMMARY

The present disclosure provides a new and innovative system, method, and apparatus that use cache blocks to reduce (or nearly eliminate) a number of times that sections of bytecode or source code are run. Each example cache block includes a demarcated section or portion of bytecode and is referenced by an entry in a cache table stored in a class or cache file. An example cache table entry includes fields that specify, for example, an identifier of the cache block, bytecode lines of the bytecode stored within the cache block, input variable(s) to the bytecode stored within the cache block, and output variable(s) of the bytecode stored within the cache block. Values of input variables are stored to the cache table entry based on which input variable values are run the most. During an application run, an execution engine (or other similar processor) is configured to execute bytecode related to the application until the bytecode related to (e.g., stored within, or designated as) the cache block is reached. Instead of executing the bytecode located in the cache block, the example execution engine determines if any input variable values of the executed bytecode match input variable values stored in the cache table entry. If there is a match, the example execution engine reads the output variable value from the cache table entry instead of executing the bytecode stored in the cache block. In some instances, the output variable value may include an object field or a location to a value stored on a stack or heap. The execution engine stores (or updates) output variable values related to the output variable to a memory for further execution of the application bytecode located after the bytecode stored in the cache block. Such a configuration enables the execution engine to pass over or skip the computationally intensive bytecode stored within the cache block and instead read the already cached output that corresponds to the loaded (and already cached) input. The example cache blocks disclosed herein accordingly provide a framework for caching portions of application bytecode.

In an example embodiment, a virtual machine apparatus includes a memory configured to store a cache file related to an application. The cache file includes a cache table within a cache table entry that references a cache block, which includes a selected portion of bytecode associated with the application. The cache table entry includes an identifier of the cache block, a demarcation of the selected portion of the bytecode of the application that is stored within the cache block, an input variable to the selected portion of the bytecode stored within the cache block, and an output variable of the selected portion of the bytecode stored within the cache block. The example virtual machine apparatus also includes a virtual machine execution engine configured to read the bytecode of the application and execute the corresponding instructions. For instance, the execution engine is configured to read the cache table to determine when to enter the cache block during execution of the bytecode, load an execution input variable from the bytecode, and determine if the execution input variable matches the input variable specified in the cache table entry. Responsive to matching the execution input variable to the input variable of the cache block, the execution engine determines if the output variable exists within the cache table entry. Responsive to determining that the output variable exists, the example execution engine reads the output variable from the cache table entry and skips execution of the selected portion of the bytecode stored within the cache block. The example execution engine also stores the output variable to at least one of a heap and a stack related to the application and executes another portion of the bytecode located after the selected portion of the bytecode stored within the cache block.

In another example embodiment, a virtual machine apparatus comprises a virtual machine execution engine configured to load an input variable value in conjunction with starting execution of bytecode associated with an application. The execution engine is also configured to read a cache table entry stored in a cache file related to the application. The cache table entry includes a demarcation of a selected portion of the bytecode of the application that is stored within a cache block, a cache block input variable, and a cache block output variable. The execution engine is further configured to compare the loaded input variable value to the cache block input variable. Responsive to the loaded input variable value matching the cache block input variable, the execution engine is configured to skip execution of the selected portion of the bytecode, read the cache block output variable, and execute another portion of the bytecode located after the selected portion of the bytecode using the cache block output variable.

Additional features and advantages of the disclosed system, method, and apparatus are described in, and will be apparent from, the following Detailed Description and the Figures.

DETAILED DESCRIPTION

As mentioned above, known programming languages provide a framework that enables data or objects to be cached. While storing frequently used or computationally intensive data and objects to a cache may improve application performance, such data and objects do not comprise many of the time-consuming tasks of an application. Indeed, many applications are programmed to execute the same sections or portions of bytecode or source code with the same data to produce the same output over multiple separate application runs. For example, some sections of iteratively-run computationally intensive bytecode are programmed to search for a value or pattern in a file. In another example, some sections of computationally intensive bytecode are programmed to translate data from one data structure into another data structure. Seemingly, thousands of algorithms have been created to reduce the computation needed for these operations. However, despite the nature of the algorithm(s), the same bytecode still has to be run each time a search is requested or a data structure is translated, which can still be computationally intensive for files or data structures that contain millions to billions of entries.

The present disclosure relates in general to a method, apparatus, and system configured to address some of the above-mentioned limitations of known programming languages by creating a new cache block that is configured to designate or cache portions of program code (e.g., bytecode or source code). In particular, the example method, apparatus, and system described herein are configured to cache inputs and outputs for a certain selected portion, section, or block of bytecode (or source code) that is frequently run or computationally intensive. The cached bytecode (e.g., bytecode that is designated as being located within a cache block) is configured to persist between application runs to enable faster processing of frequently used inputs. During subsequent runs, the selected cached bytecode can be skipped if one of the already cached inputs are received or loaded during a run. The output corresponding to the matching cached input is selected without having to execute the time-consuming bytecode stored in the cache block. The example method, apparatus, and system described herein accordingly optimize applications that frequently execute the same code by caching inputs with known outputs.

As disclosed herein, applications are defined by bytecode (or source code) that includes a set or stream of instructions that define one or more functions, methods, or operations. Certain sections of bytecode can be more computationally intensive than other sections. For example, data look-up loops maybe executed thousands to millions of time to search a file for a particular data item. The example disclosure uses example cache blocks to store in a cache memory certain selected portions of bytecode that are determined to be frequently used or computationally intensive. As described in more detail below in conjunction with FIG. 4, a cache block is configured to store or otherwise relate to selected lines of bytecode. Oftentimes, the selected portion of bytecode stored to or identified as a cache block includes one or more inputs and provides one or more outputs. The inputs and outputs are defined as variables. For example, values for input variables of the cached bytecode may be loaded or determined from another section of bytecode that is executed before the cached bytecode. Values of output variables are cached and stored for execution of other sections of bytecode that are executed after the cached bytecode.

Each cache block is referenced by an entry (or row) in a cache table. Each entry includes, for example, an identifier of the cache block (or a link to the cache block) and a demarcation of bytecode lines that define or specify the location of the bytecode specified within the cache block that is relative to the rest of the application bytecode. Each cache table entry also includes input variable values for the cache block input variables and cache block output variable values. In other words, the input values to the cached bytecode and the corresponding resulting output values of the cached bytecode (related to the input values) are stored in the cache table entry.

The example cache table is included within a cache file and/or class file and is configured to be executed by a virtual machine execution engine at runtime. Each row in the cache table corresponds to different input values (and corresponding output values) for the same cached bytecode. Such a configuration enables frequently accessed or loaded input values to be cached in conjunction with the corresponding output values of the cached bytecode. Rows in a cache table may also reference different cache blocks that include different portions of application bytecode. During operation, the virtual machine execution engine reads cache table entries to determine which sections or portions of bytecode are cached. During runtime, when the execution engine reaches those sections of bytecode, a check is performed to determine if runtime input variable values match already cached input values. If there is a match, the cached output is read from the table entry and the cached bytecode in the cache block is skipped or passed over.

Reference is made herein to input variables related to cached bytecode. The type of the input variable determines what is stored to a cache table entry. For example, a cache table entry may include a name, a value, a pattern and/or a location on a stack or heap for static, local, and global variables. In another example, a cache table entry may include a hash of an object, an object field, and/or an attribute of an object for input variables that are defined as objects. Similarly, a cache table entry may include a name, a value, a stack or heap position for static, local, and/or global variables. Additionally, a cache table entry may include a name of an object field, a value of an object field, an object attribute, and/or a hash of an object for output variables that are defined as objects.

The example method, apparatus, and system disclosed herein provide optimization for bytecode configured to search for a value or pattern within a file or transfer data between different data structures of files. In these instances, the inputs and outputs are relatively well defined and stable, which enables the corresponding bytecode to be cached instead of operated for each run. For instance, caching bytecode related to searching for a pattern within a file may be performed by creating a cache table entry. The pattern would be stored to the table entry as the input variable value. The output value stored in the table entry would be an index in the file (e.g., a position of a string or pattern in the file). For the first run, the pattern has to actually be searched to determine the file index value. The pattern and file index value may then be cached together in the same cache table entry related to the cached bytecode. Then, for subsequent runs with the same pattern, the cache table entry is accessed instead of the cached bytecode to determine the file index value.

It should be appreciated that use of cache blocks may be burdensome for operations that are affected by external or random elements. For example, bytecode that generates a random integer number may not operate properly if cached because the cached output would always be the same. In another example bytecode that affects elements outside of a virtual machine execution engine may not operate as planned. For instance, bytecode that is configured to generate messages or write into a file (other than storing an output value to a stack or heap) may not operate properly when cached since the same message would be generated or the same location in the file would be written. Further, bytecode that is configured to receive input from a user may not operate properly when cached. However, bytecode that uses an input value provided by a user as an input variable may be cached and operate properly because the input is received from the user through bytecode that is not cached.

Example Virtual Machine Computing System

Figure 1:
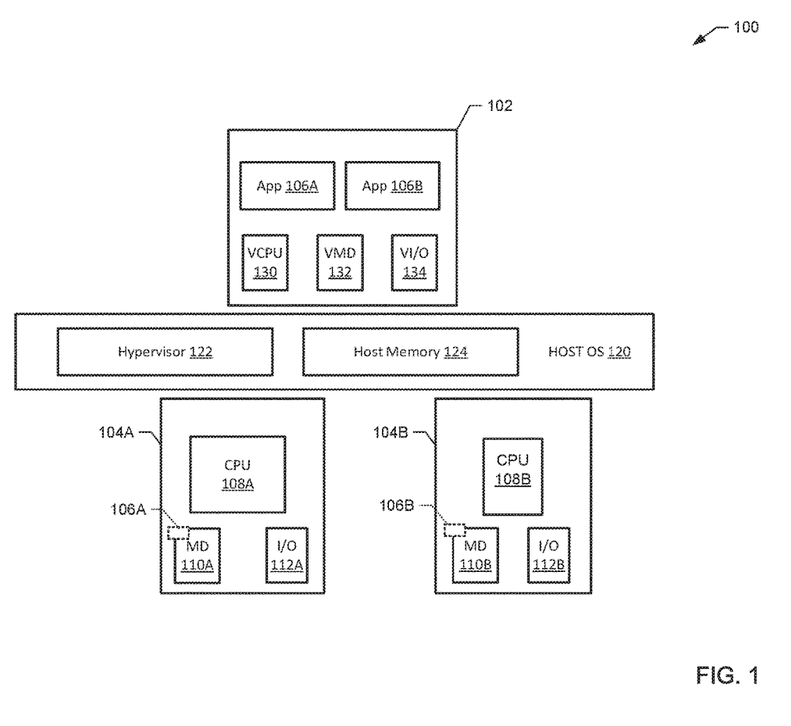
FIG. 1 shows a diagram of an example computing system for a virtual machine configured to use cache blocks to cache portions of application bytecode, according to an example embodiment of the present disclosure.

FIG. 1 shows a diagram of an example computing system 100 for a virtual machine 102 configured to use cache blocks to cache portions of application bytecode, according to an example embodiment of the present disclosure. The computer system 100 may include one or more interconnected host devices 104A and 104B configured to operate one or more applications. Each host device 104 may in turn include one or more physical processors (e.g., CPU 108A and 108B) communicatively coupled to respective memory devices (e.g., MD 110A and 110B) and input/output devices (e.g., I/O 112A and 112B). The memory devices 110A and 110B are configured to store the one or more applications 106A and 106B as bytecode or source code to be executed by the virtual machine 102.

As used herein, physical processor or processor 108A and 108B refers to a device configured to execute instructions encoding arithmetic, logical, and/or I/O operations specified by stored application bytecode 106A and 106B. In one illustrative example, a processor may be configured according to a Von Neumann architectural model and may include an arithmetic logic unit ("ALU"), a control unit, and a plurality of registers. In an example embodiment, a processor may be a single core processor that is typically capable of executing one instruction at a time (or process a single pipeline of instructions), or a multi-core processor that may simultaneously execute multiple instructions. In another example embodiment, a processor may be implemented as a single integrated circuit, two or more integrated circuits, or may be a component of a multi-chip module (e.g., in which individual microprocessor dies are included within a single integrated circuit package and share a single socket). A processor may also be referred to as a central processing unit ("CPU").

As discussed herein, a memory device 110A and 110B refers to a volatile or non-volatile memory device, such as RAM, ROM, EEPROM, or any other device capable of storing data. The memory device 110A and 110B may also include portions designated or configured for cache memory. As discussed herein, I/O device 112A and 112B refers to a device capable of providing an interface between one or more processor pins and an external device, the operation of which is based on the processor inputting and/or outputting binary data. The I/O device 112A and 112B may interface with, for example, a display, a keyboard, and/or a network.

The example computer system 100 includes a host operating system ("OS") 120 configured to manage the processing by the virtual machine 102 of the application bytecode stored in the host devices 104A and 104B. The operating system 120 includes a hypervisor 122 or virtual machine monitor ("VMM") configured to run the virtual machine 102. In an example embodiment, the hypervisor 122 may be a component of the host operating system 120 executed by the computer system 100. In another example embodiment, the hypervisor 122 may be provided by an application running on the operating system 120, or may run directly on the computer system 100 without an underlying operating system. The hypervisor 122 may virtualize the physical layer of the host devices 104A and 104B, including processors, memory, and I/O devices, and present this virtualization to the virtual machine 102 as devices, including virtual processors (e.g., VCPU 130), virtual memory devices (e.g., VMD 132), and/or virtual I/O devices (e.g., VI/O 134).

The example virtual machine 102 of FIG. 1 may run on any type of dependent, independent, compatible, and/or incompatible applications on the underlying hardware and OS (e.g., Host OS 120). In an example embodiment, the applications 106A and 106B execution on the virtual machine 102 may be dependent on the underlying hardware and/or OS 120. In another example embodiment, the applications 106A and 106B execution on a virtual machine 102 may be independent of the underlying hardware and/or OS 120. For example, the applications 106A and 106B execution on the virtual machine VM 102 may be dependent on the underlying hardware and/or OS 120 while applications (not shown) execution on a second virtual machine (not shown) are independent of the underlying hardware and/or OS 102.

The hypervisor 122 manages host memory 124 for the host operating system 120 in addition to memory allocated to the virtual machine 102 and the virtual memory device 132. Host memory 124 and the virtual memory device 130 may be divided into a plurality of memory pages that are managed by the hypervisor 122. Virtual memory device 132 allocated to the host OS 120 are mapped from host memory 124 (and/or the host device memory 110A and 110B) such that when the application 106 uses or accesses a memory page of virtual memory device 132 it is actually using or accessing host memory 124. For instance, bytecode of the application 106A may be stored at the memory device 110A. Before runtime on the virtual machine 102, the bytecode is transmitted to the host memory 124 for processing by the virtual machine 102 via the virtual memory device 132.

Figure 2:
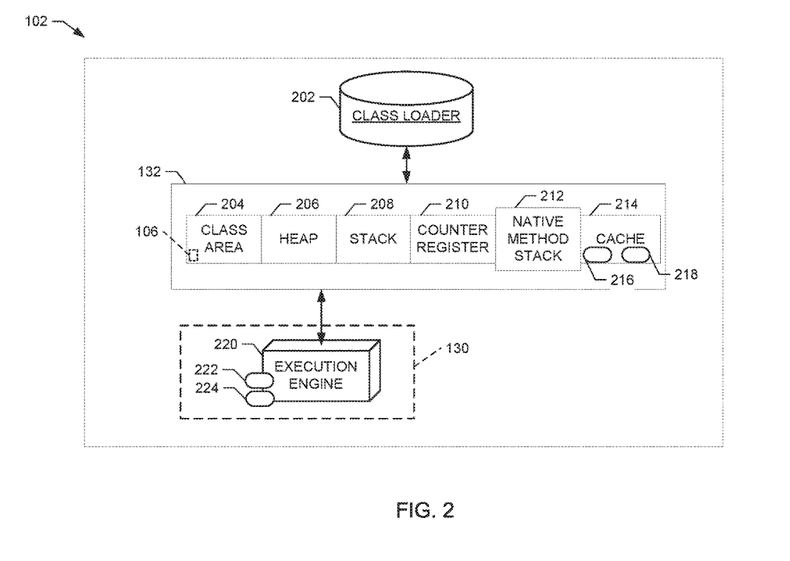
FIG. 2 shows a diagram of the example virtual machine of FIG. 1 configured to execute cache blocks, according to an example embodiment of the present disclosure.

FIG. 2 shows a diagram of the virtual machine 102 of FIG. 1, according to an example embodiment of the present disclosure. In some examples, the virtual machine 102 may include a Java™ virtual machine that includes a specification and/or implementation for providing a runtime environment to execute Java™ application bytecode. In other examples, the virtual machine may include other types of virtual machines, such as a Python or a C/C++ virtual machine.

The example virtual machine 102 is configured to load bytecode of an application stored in the memory devices 110A and 110B or the host memory 124. The example virtual machine 102 is also configured to verify and execute the bytecode and provide a runtime environment for running instructions defined within the bytecode. The virtual machine 102 may also provide definitions for memory area, class file format, register set, a heap, and/or fatal error reporting.

The example virtual machine 102 includes a class loader 202 configured to load class files from the virtual memory device 132. For example, the class loader 202 is responsible for locating libraries, reading their contents, and loading the classes contained within the libraries. In some examples, the virtual machine 102 may load a bootstrap class, an extensions class, and a system class at startup. The class loader 202 may also load class files and/or cache files that include cache tables.

The class loader 202 is communicatively coupled to the virtual memory device 132 for loading the class files, libraries, and interfaces. The virtual memory device 132 may be partitioned into separate blocks based on the underlying data. For example, the virtual memory device 132 of FIG. 2 includes a class area 204 configured to store pre-class structures such as a runtime constant pool, field and method data, and code for methods. The class area 204 may also store the bytecode of the application 106. The virtual memory device 132 also includes a heap 206 configured to store runtime data in which objects are allocated and a stack 208 configured to store frames. For instance, the stack 208 may store local variables and partial results. The stack 208 may also support method invocation and return. The virtual memory device 132 further includes a program counter register 210 configured to store an address of an instruction being executed by the virtual machine 102. Moreover, the virtual memory device 132 includes a native method stack 212 configured to store native methods used within, for example, the application 106.

The example virtual memory device 132 may also include a cache 214 configured to store cache blocks 216 and/or cache tables 218. The example cache blocks 216 are configured to store selected bytecode of the application 106. The example cache table 218 is configured to include cache table entries that each reference a cache block and specify input and output variable values for the related cache block. In some instances, the cache 214 is physically located at the host memory 124 and/or the memory device 110 of FIG. 1 such that the stored bytecode and table entries persist through multiple runs of the application 106 and/or deactivation and reactivation of the virtual machine 102.

As mentioned above, the virtual machine 102 may be configured to operate as a Java™ virtual machine. In these examples, the cache block 216 is a construct of a Java™ class file that is specified by demarcated lines of bytecode in an entry within the cache table 218. The cache blocks 216 may be part of both the application 106 and the Java™ virtual machine 102. Accordingly, the Java™ virtual machine 102 is configured to support cache blocks 216 and understand how to process the information within the cache table 218. Otherwise, a Java™ virtual machine that is not configured for cache blocks may just ignore or disregard the cache blocks 216.

The example virtual machine 102 also includes an execution engine 220, which may be part of the virtual processor 130 of FIG. 1. The execution engine 220 includes an interpreter 222 configured to read the application bytecode 106 and execute instructions specified by the bytecode. The execution engine 220 may include a compiler 224 configured to read and compile parts of the bytecode that have similar functionality. The complier 224 may also translate an instruction set from the interpreter 222 into an instruction set for a specific processor or CPU, such as the CPU 108A of FIG. 1. In some instances, the compiler 224 (before or during runtime) may compile cached bytecode located in the cache block 216 into the cache table 218.

Each of the applications 106 may have one or more threads of execution within the execution engine 220. Each thread of a running Java™ application (e.g., the applications 106A and 106B) is a distinct instance of the execution engine 106. Typically, from the beginning of its lifetime to the end, a thread is either executing the application bytecode or native methods. A thread may execute bytecode directly, by interpreting or executing natively in a processor, or indirectly, by just-in-time compiling and executing the resulting native code. A bytecode steam of an application is a sequence of instructions for the execution engine 220. Each instruction may include a one-byte opcode followed by zero or more operands. The opcode indicates the operation to be performed. Operands supply extra information used by the execution engine 220 to perform the operation specified by the opcode. The opcode itself indicates whether or not it is followed by operands, and the form the operands may take. Some instructions have no operands, and therefore consist only of an opcode. Depending upon the opcode, the execution engine 220 may refer to data stored in other areas in addition to (or instead of) operands that trail the opcode. When it executes an instruction, the execution engine 220 may use entries in the current runtime constant pool, entries in the current frame's local variables, or values stored on the top of the current frame's operand stack.

For example the execution engine 220 runs by executing bytecode one instruction at a time. This process takes place for each thread (execution engine instance) of the application 106 running in the virtual machine 102. The execution engine 220 fetches an opcode and, if that opcode has operands, fetches the operands. It executes the action requested by the opcode and its operands, then fetches another opcode. Execution of bytecodes continues until a thread completes either by returning from its starting method or by not catching a thrown exception.

The execution engine 220 may encounter an instruction that requests a native method invocation from the native method stack 212. On such occasions, the execution engine 220 is configured to attempt to invoke that native method. When the native method returns, the execution engine 220 is configured to continue executing the next instruction in the bytecode stream.

Cache Table and Cache Block Embodiment

Figure 3:
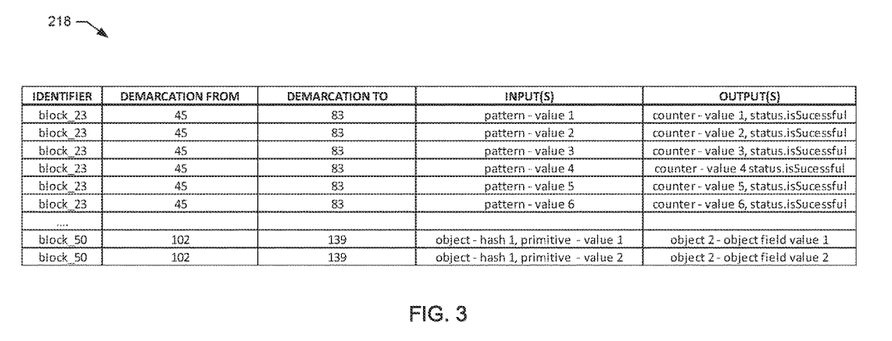
FIG. 3 shows a diagram of a cache table, according to an example embodiment of the present disclosure.
Figure 4:
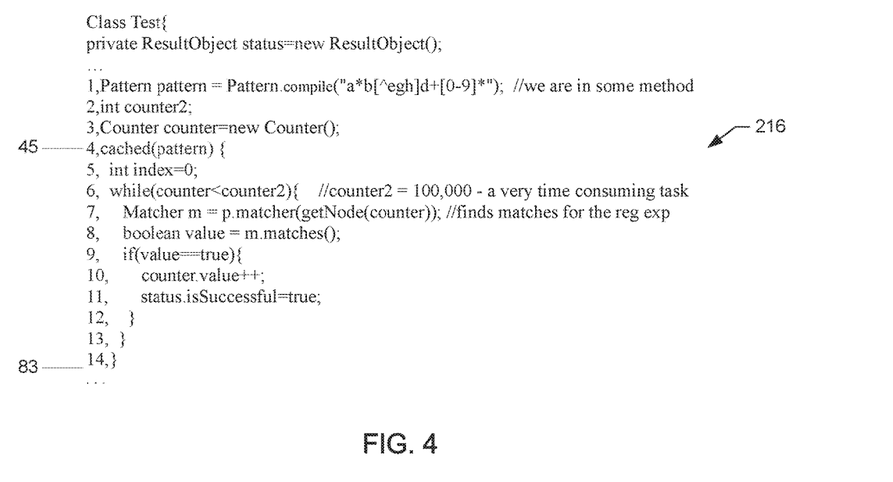
FIG. 4 shows a diagram of a cache block, according to an example embodiment of the present disclosure.

FIG. 3 shows a diagram of a cache table (e.g., the cache table 218 of FIG. 2), according to an example embodiment of the present disclosure. FIG. 4 shows a diagram of a cache block (e.g., the cache block 216 of FIG. 2), according to an example embodiment of the present disclosure. The example cache block 216 of FIG. 4 is referenced by the cache table 218 of FIG. 3.

The example cache block 216 of FIG. 4 is a construct of a class file (e.g., a Java™ class file) and is configured to store, distinguish, or relate lines of bytecode. A developer selects or specifies which lines of the bytecode are to be stored in or associated with the cache block 216. In other examples, the execution engine 220 may determine automatically which sections or portions of application bytecode are to be stored to a cache block. In the example of FIG. 4, the bytecode from lines 45 to 83 are stored in the cache block 216. Line 45 represents a beginning code line and line 83 represents an ending code line of the selected portion of the bytecode stored within (or otherwise associated with) the cache block 216. It should be appreciated that local line numbers (1 to 14) described in connection with the cache block 216 are for reference only to the particular lines of bytecode within the cache block 216 and are not related to the line numbers of the application bytecode.

The cache table 218 of FIG. 3 is created from the cache block 216. For instance, the compiler 224 may create the cache table 218 in one or more class files or cache files of the class area 204 of FIG. 2. The compiler 224 creates a row or entry within the cache table 218 for the cache block 216. Each table entry includes an identifier of the cache block 216 (e.g., Identifier, such as the 'block_23' identifier of FIG. 3), and a demarcation of the selected portion of the bytecode of the application that is stored within the cache block 216 (e.g., the demarcation of lines 45 to 83 shown in the cache table 218 of FIG. 3). Demarcation from 45 to 83 designates the bytecode illustrated in the cache block 216 of FIG. 4. The cache table entries also include an 'Input' field that represents names of local variables, global variables, objects, etc. that affect the bytecode located within the cache block 216. The cache table entries further include an 'Output' field that represents names of local variables, global variables, objects, etc. that are modified by the bytecode located within the cache block 216. The 'Input' field and/or the 'Output' field may also include values, stack locations of values, object hashes, object attributes, and/or object fields that are related to the named input or output variables.

It should be appreciated that input variables and output variables that are local to the cached bytecode are generally not stored to the cache table entry. For instance, variables that are only initiated and used within cached bytecode are not executed if the bytecode is skipped (in the event loaded input variable values match cached input variable values). Further, variables that are not modified by the cached bytecode are also not cached since no change occurs. Such a configuration ensures that the cache table entries include variables used externally by the other bytecode that is not stored in the cache block 216.

In some embodiments, the example compiler 224 is configured to populate the input and output variables of the cache table entry in addition to specifying the demarcated code lines. For instance, a developer may specify within the cache block 216 which of the variables are designed as input variables or output variables for the cache table entry. The compiler 224 reads the designation and accordingly populates the cache table entry. In other instances, the compiler 224 may automatically determine the input and output variables by analyzing the bytecode stored in the cache block 216 to other portions of the bytecode to identify variables used in each. The compiler 224 may then determine if the variable is an input or output variable by determining the position of the variable in the cached bytecode relative to the non-cached bytecode. For instance, a variable first used in the cached bytecode and used in subsequent non-cached bytecode would be classified as an output variable.

In other instances, a developer may create the cache table 218 of FIG. 3 and determine the identifier, demarcation lines, inputs, outputs of the bytecode stored in the cache block 216. In these instances, the developer may only provide the variable names. The values of the variables may be determined by the execution engine 220 during runtime of the application bytecode 106. In this manner, the developer does not have to predict or determine what are the most common input variable values. Instead, the developer may only have to identify the portion of the application bytecode 106 (and input/output variables) that is computationally intensive and used frequently. The execution engine 220 is configured to then cache input variable values and corresponding output variable values as the bytecode in the cache block 216 is executed over subsequent runs.

FIG. 3 shows an example of the cache table 218 after a number of runs where more than one value is cached. The first six entries of the cache table correspond to the same cached bytecode, which is shown in the code block 216 of FIG. 4. Accordingly, the six table entries have the same identifier and demarcation lines. However, the input and output values are different for each entry. For example, in a first run an input variable named 'pattern' is loaded within a first value (i.e., value 1). The execution engine 220 determines no output value is cached and accordingly executes the bytecode within the cache block 216. After executing the bytecode, the execution engine 220 determines that a counter output variable has first value of 'value 1' and a 'status.isSuccessful' is set. During subsequent runs, the execution engine 220 determines if the loaded pattern input variable has a value of 'value 1'. If the value is 'value 1', the execution engine 220 accesses the cached output variable values for counter and 'status.isSuccessful' instead of executing the bytecode in the cache table 218.

The other five lines related to the cache block 216 are for other input variable values and corresponding output variable values. While FIG. 3 shows an entry for each variable value, in other instances, only one cache table entry may exist for the cache block 216 such that all variable values are stored to the input and output variable fields. However, such a configuration would require that each input value is referenced or otherwise associated with the corresponding output variable values.

The example cache table 218 also includes entries for another cache block (i.e., cache block_50). This additional cache block stores another portion of bytecode with a beginning line of 102 and an ending line 139. In other examples, a cache table may only reference one cache block such that another cache table would be needed for the cache block_50.

As discussed above, the cache block 216 of FIG. 4 stores (or is associated with) a portion of the application bytecode 106. The selected portion of bytecode shown in FIG. 4 is illustrative of bytecode that may be stored to a cache block. Other bytecode that may be stored can include additional input variables, different types of input variables, additional output variables, different types of output variables, and/or be configured to perform different routines, functions, methods, or operations.

The example bytecode of FIG. 4 is configured to match a pattern to a string within a file. The output from the bytecode includes an indication if the pattern is within the file, and if so, an index location within the file. The pattern may have been provided by a user or determined by a previous section of bytecode.

In the illustrated example, the lines of code up through Line 3 are outside of the cache block 216 or not stored to the cache block 216. In other words, the lines of bytecode through Line 3 are illustrative of bytecode before the selected bytecode related to the cache block 216. The first two lines (before Line 1) define the class 'Test' that includes a field of an object called 'ResultObject'. Line 1 of the bytecode defines a pattern, named 'pattern', configured to be used within a matcher object. The pattern represents an input that is used to match to a string within a file. In this example, the pattern is illustrated as a regular resource to show that processing of the 'pattern' input variable is a time-consuming operation to justify the placement of the subsequent selected portion of bytecode within the cache block 216. During runtime, the 'pattern' variable is loaded by the execution engine 220 before the bytecode associated with the cache block 216 is reached.

Line 2 of the bytecode defines a local variable named 'counter2'. This local variable is not modified within the cache block 216, and is accordingly not cached within the cache table 218. Line 3 of the bytecode defines a variable named 'counter'. This variable is modified within the cache block 216 and is accordingly cached within the cache table 218. Line 4 defines the state of the cache block 216. The bytecode 'cached(pattern)' specifies that 'pattern' is an input variable to the cache block 216 and that subsequent values of 'pattern' are to be cached. This configuration may be used by the execution engine 220 to determine which variables are to be populated in the 'Input' field. As provided in Line 4, 'pattern' is used within the cache block 216 and is accordingly cached within the cache table 218. The bytecode 'cache(pattern)' also specifies that the subsequent bytecode is to be cached according to the specified pattern input variable.

Line 5 of the bytecode defines a local variable named 'index'. The 'index' local variable is used within the cache block 216 but is not cached in the cache table 218 because the 'index' variable is not visible outside of the cache block 216. Line 6 of the bytecode defines a time-consuming loop of possibly 100,000 iterations to search a file. Lines 7 to 9 use the 'counter' variable to iteratively access different lines in the file to determine if the respective string matches the 'pattern'. Lines 10 and 11 specify the output variable values for 'counter' and 'status.isSuccessful'. The 'counter' variable returns an index location of the string in the file that matches the 'pattern'. The 'status.isSuccessful' is an object variable that indicates whether the 'pattern' matched a string within the file. Both the 'counter' and 'status.isSuccessful' variables are used outside the cached bytecode within subsequent bytecode and are accordingly stored to the 'Output' field of the cache table 218.

Using the Cache Block for Different Variable Types

As discussed above, the input and output variables can include values, locations on a stack, patterns, objects, etc. The example execution engine 220 of FIG. 2 is configured to handle the types of variables differently. Regarding storage of input variables, the execution engine 220 is configured to store certain information to the 'Input' field of the cache table 218 based on variable type in addition to the variable name. The cached variable information (or values) is later used when the same variable information is loaded at runtime to enable skipping of the cached bytecode. For object variables, the example execution engine 220 is configured to create a hash of the object or an attribute of an object using, for instance, a hashcode method. The execution engine 220 then stores the hash into the cache table entry. For local/global primitive variables and patterns, the execution engine 220 is configured to store an input variable value and/or an index location to the stack 208 or the heap 206 of FIG. 2.

In a similar manner, the example execution engine 220 is configured to store or save output values (and/or stack locations) of local/global primitive variables and patterns to an entry of the cache table 218. For example, the execution engine 220 stores output static values by saving to the cache table 218 the output value in conjunction with the variable name. For local (and/or global) variables of the bytecode (not specific to the cached bytecode located in the cache block 216), the example execution engine 216 is configured to store the cache table 218 a position of the output variable within an operand stack (e.g., the stack 208 of FIG. 2) in addition to a value of the variable. The execution engine 220 is configured to not store local variables that are specified only to the bytecode of the cache block 216 because these output variables are not used in the other sections of the application bytecode 106. For instance, the variables named 'index', 'm', and 'value' are local to the cache block 216 and not stored in the cache table 218.

In some instances, only a position of the local variable in the stack is saved to the cache table 218. However, this may present an issue because it may not be guaranteed that the local variable is located at the same position within the stack. Accordingly, the execution engine 220 may be configured to check or verify the position of the stack using, for example 'back' information or debug information. For instance, the compiler 224 may be configured to store variable names and/or variable types of the variable values within the stack within the debug information. The execution engine 220 at runtime may then compare variable name and/or type to the specified position within the stack to ensure the position is the same as specified in the cache table 218. If the position is the same, the execution engine 220 provides this stack location to the memory as an output variable value for further processing of the application bytecode 106.

By comparison, the execution engine 220 is configured to store objects (or object attributes) that have been serialized. It should be appreciated that many object attributes are not modified within a cache block. Accordingly, only the modified object attributes are serialized and included within the 'Output' field of the cache table 218. Unmodified attributes may be serialized as 'Null'. The execution engine 220 may also store one or more fields of an object within the 'Output' field of the cache table 218. Storing a field may include saving a class type of the object, a name of the field, and/or a value of the field.

In addition to storing input and output variable information, the execution engine 220 is configured to load inputs from the cache table 218 during runtime execution as the bytecode thread enters the cache block 216. If there is a match between an input variable loaded from the executed bytecode (e.g., an execution input variable value) and a corresponding cached input variable, the execution engine 220 is configured to apply the associated cached outputs and skip execution of the cache block 216. The execution engine 220 is configured to apply the cached outputs to the virtual memory device 132 differently based on the type of the variable. For static output values, the execution engine 220 is configured to search the heap 206 for the static output variable name. If the execution engine 220 locates the output variable within the heap 206, the execution engine 220 is configured to overwrite the output value at the heap 206 with the cached output value located in the cache table 218. However, if the execution engine 220 does not locate the output variable within the heap 206, the execution engine 220 is configured to create the output static variable on the heap 206 and store the cached output value located in the cache table 218.

Regarding objects of fields of the 'object "this"', the example execution engine 220 is configured to locate the object by searching for a reference to the object in, for example, a local variables array. The execution engine 220 determines which field or attribute of the object is stored in the cache table and accordingly loads the associated value. If the value of the field or attribute is primitive, the execution engine 220 is configured to replace the value of the field or attribute within the local variables array with the cached output value. However, if the cached output variable is an entire object, the execution engine 220 is configured to de-serialize the cached object and rewrite the values of the object within the local variables array using the non-Null values of the de-serialized object stored within the cache table 218.

Regarding local primitive variables, the example execution engine 220 is configured to load the local variable value from the cache. The local variable may include a value and/or a position in the stack 208. In instances where the stack position is not cached, the execution engine 220 is configured to determine the expected position of the output variable within the stack 208. For example, the execution engine 220 may match a name of the variable to variable names within the stack 208 or access a variable-stack reference list. As discussed above, the execution engine 220 verifies a position of the local variable within the stack using debug information. Once the position in the stack 208 is verified, the execution engine 220 is configured to replace a value of the local variable in the stack by the cached value.

Regarding local object variables, the example execution engine 220 is configured to load the serialized object from the cache table 218 and load or determine an expected position within the stack 208. The execution engine 220 determines a reference to the original object using the expected position of the value within the stack 208. The execution engine 220 also de-serializes the cached object. The execution engine 220 then checks whether a type of the original object is the same of a type of the cached object. If the types are different, the execution engine 220 is configured to cancel the process of applying the cached output variable object to memory and executes the bytecode located within the cache block 216. However, if the types are the same, the execution engine 220 is configured to rewrite one or more values of the original object using non-Null values of the serialized object.

Automatic Creation of Cache Block Embodiment

The example cache blocks disclosed herein are programming extension tools configured to reduce a number of times computationally-intensive blocks of bytecode are executed. In some embodiments, cache blocks are specified by a developer. For example, a developer determined that Lines 5 to 13 of the bytecode shown in FIG. 4 would be acceptable for the cache block 216 and accordingly added Line 4 to define the cache block 216 and specify the input variables to be cached. The developer also specified which of the output variables are to be cached.

However, in some examples, the execution engine 220 is configured to automatically create cache blocks. For example, the execution engine 220 may use one or more timers to determine how long certain threads of bytecode take to execute. The execution engine 220 identifies blocks of bytecode that take longest to execute and apply one or more rules to check whether the bytecode would be acceptable for a cache block. For instance, rules may define bytecode that generates random data, sends messages, writes or a file, or waits for a user to provide a value into a field. The execution engine 220 applies the rules to ensure that the targeted bytecode does not perform the operations or methods specified within the rules.

After verifying the operation of the targeted bytecode, the execution engine 220 is configured to analyze the variables to determine input variables and output variables that are non-local or used outside of the cached bytecode. For instance, the execution engine 220 may be configured to determine a first reference of a variable with respect to other references of the same variable located in other sections of the bytecode to determine if the variable is local or whether the variable is an input or output. For instance, variables referenced only within the targeted bytecode would be local and accordingly not cached. Variables that are referenced in earlier sections of bytecode (e.g., bytecode executed before the targeted bytecode) may be input variables and accordingly cached in the 'Input' field of the cache table 218. Variables that are referenced in later sections of bytecode (e.g., bytecode executed after the targeted bytecode) may be output variables and accordingly cached in the 'Output' field of the cache table 218.

The example execution engine 220 may then define the cache block by writing to the bytecode the line, 'cache(input variables)', with the input variables being the identified and cached input variables. The execution engine 220 determines a demarcation of the cached bytecode relative to the other bytecode and specifies the demarcation in the cache table 218. The execution engine 220 further determines an identifier of the cache block and stores this identifier to the cache table 218 and/or the cache block 216. At this point, the cache block 216 is ready for execution.

Flowchart of Example Processes Related to Cache Blocks

Figure 5:
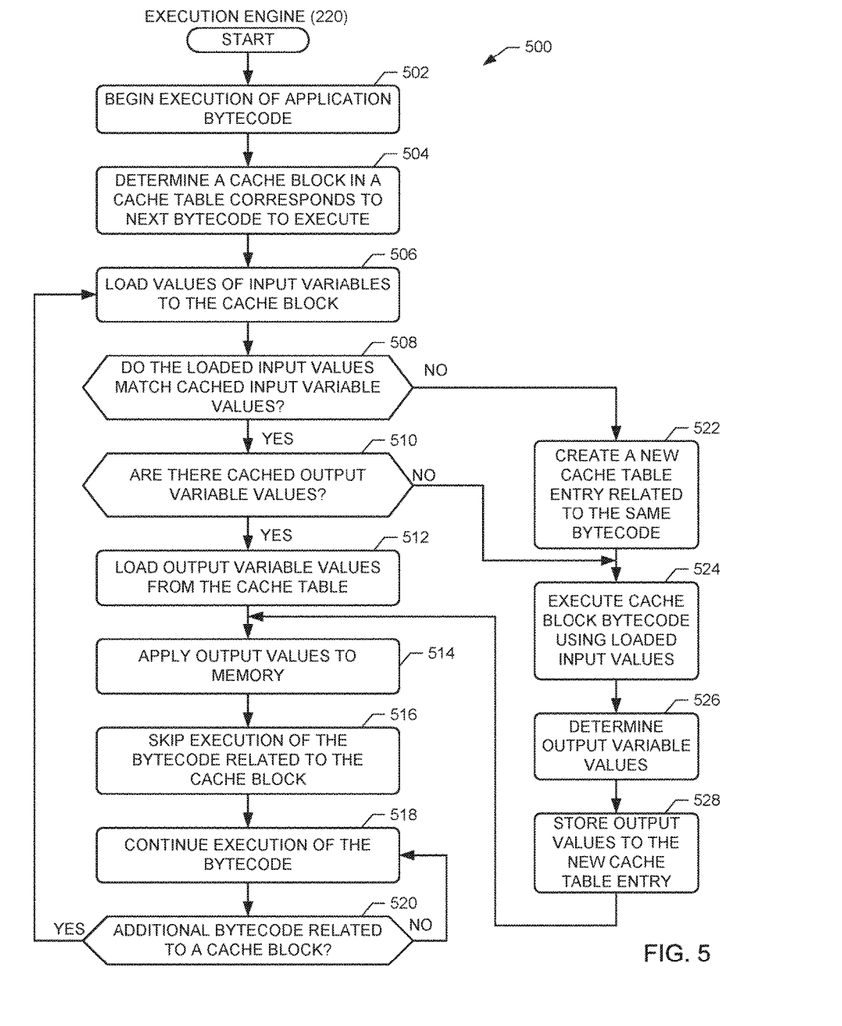
FIG. 5 shows a flow diagram illustrating an example procedure to execute application bytecode using at least one cache block, according to an example embodiment of the present disclosure.

FIG. 5 illustrates a flow diagram showing example procedure 500 to execute application bytecode using at least one cache block, according to an example embodiment of the present disclosure. Although the procedure 500 is described with reference to the flow diagram illustrated in FIG. 5, it should be appreciated that many other methods of performing the steps associated with the procedure 500 may be used. For example, the order of many of the blocks may be changed, certain blocks may be combined with other blocks, and many of the blocks described are optional. For instance, the procedure 500 may omit the step of checking for output variables if cache blocks are created only when output variables are known or determined. Further, the actions described in procedure 500 may be performed among multiple devices including, for example the execution engine 220, one or more virtual machines 102, one or more processors 110, and/or one or more servers.

The example procedure 500 of FIG. 5 begins when the execution engine 220 starts executing application bytecode (e.g., the application bytecode 106 of FIGS. 1 and 2) (block 502). The execution engine 220 at the start of execution also reads the cache table 218 from a class file or a cache file to determine which bytecode is stored in one or more cache blocks (block 504). Next, the example execution engine 220 loads one or more values of input variables from the bytecode preceding the cache block 216 (506). The loaded values may be execution input variables or execution input variable values. The execution engine 220 determines whether the loaded input variables are located in the cache table 218 by comparing the values of the loaded variables to the values stored in the cache table (block 508). If the loaded input values match the cached input values, the execution engine 220 is configured to determine whether there are cached output values that correspond to the cached input values (block 510).

Conditioned upon there existing cached output values for the respective input values, the execution engine 220 is configured to load the output variable values from the cache table 218 (block 512). The execution engine 220 then applies the loaded output variable values to memory (block 514). As discussed above, applying the values to memory is dependent upon the output variable type and may include storing the value to the heap 206 or the stack 208 of FIG. 2. Further, the execution engine 220 is configured to skip execution of the bytecode related to or located within the cache block 216 (block 516). The execution engine 220 can skip the execution of the cached bytecode because the output values that would have been determined by the cached bytecode based on the loaded input values are already known and previously cached.

After skipping execution of the cached bytecode, the example execution engine 220 may then continue execution of the bytecode by executing the lines of bytecode that proceed the cached bytecode (block 518). During execution of the remaining threads or sections of bytecode, the execution engine 220 determines if there are any additional cache blocks (block 520). If there are additional cache blocks, the execution engine 220 returns to block 506 to load input variables of the next cache block to be executed. However, if there are no additional cache blocks, the execution engine 220 continues to execute the application bytecode until the application ends or is closed. It should be appreciated that in some instances, the cached bytecode and cached output/input variables within the cache table 218 persist after the application closes such that they are available for subsequent application runs.

Returning to block 508, if the loaded input value is not within the cache table 516 (meaning this is the first time the particular input value is being run), the example execution engine 220 creates a new cache table entry for the same cached bytecode and stores the loaded input variable values to the 'Input' field (block 522). In other instances, the execution engine 220 adds the loaded input variable values to the 'Input' field of the already created cache table entry related to the cache block. The execution engine 220 then executes the cached bytecode using the loaded input values (block 524). The block 524 is also performed in instances where the execution engine 220 determines there is no corresponding cached output value for a certain cached input value, as provided in block 510. During execution of the bytecode within the cache block 216, the execution engine 220 determines output variable values (block 526). The execution engine 220 then stores the determined output variable values to the new cache table entry (block 528). Alternatively, the execution engine 220 stores the determined output variable values to the 'Output' field of the already created cache table entry related to the cache block 216. The execution engine 220 then proceeds to blocks 514 to 520 where the determined output variable values are applied to memory and the subsequent bytecode after the cached bytecode is executed.

Figure 6:
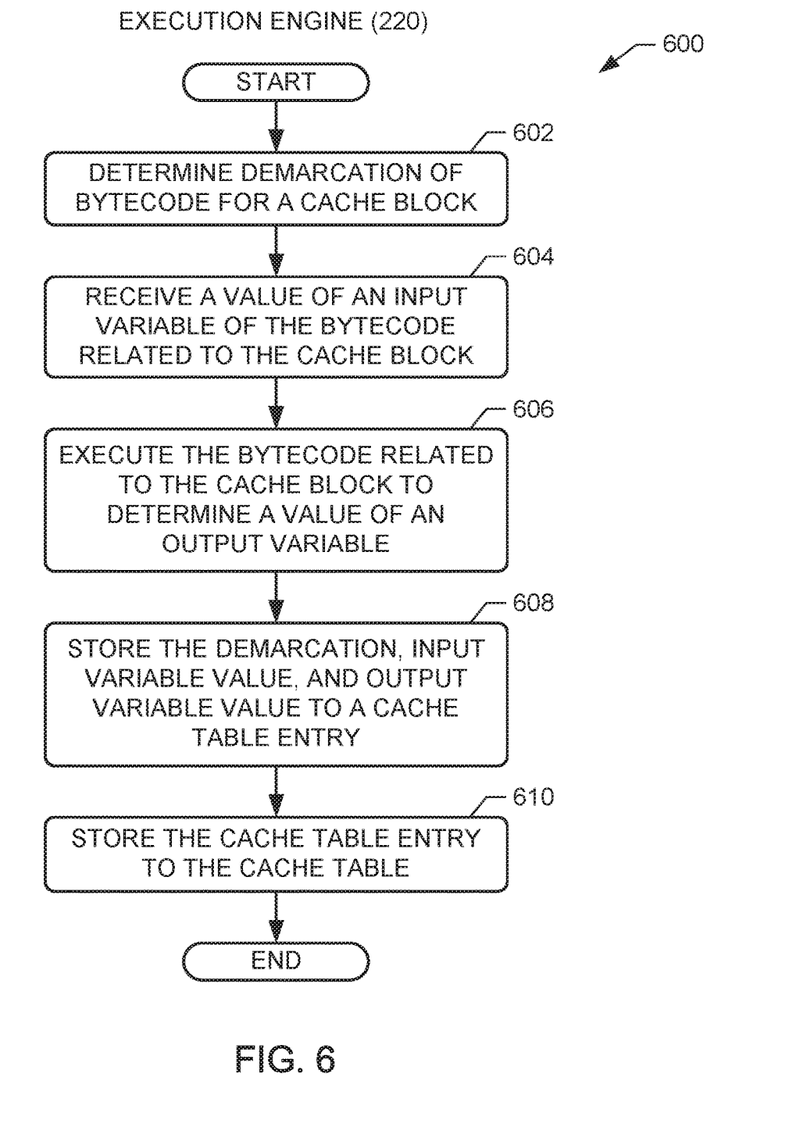
FIG. 6 illustrates a flow diagram showing an example procedure to create a cache table entry for a cache block, according to an example embodiment of the present disclosure.

FIG. 6 illustrates a flow diagram showing example procedure 600 to create a cache table entry for a cache block, according to an example embodiment of the present disclosure. Although the procedure 600 is described with reference to the flow diagram illustrated in FIG. 6, it should be appreciated that many other methods of performing the steps associated with the procedure 600 may be used. For example, the order of many of the blocks may be changed, certain blocks may be combined with other blocks, and many of the blocks described are optional. For instance, the procedure 600 may include additional steps is performed automatically by the execution engine 220, as discussed above. Further, the actions described in procedure 600 may be performed among multiple devices including, for example the execution engine 220, one or more virtual machines 102, one or more processors 110, and/or one or more servers.

The example procedure 600 of FIG. 6 begins when the execution engine 220 determines a demarcation of bytecode located within a cache block (e.g., the cache block 216 of FIG. 4) (block 602). The execution engine 220 may receive the demarcation from a developer or automatically determine the demarcation based on which lines of bytecode are located within brackets following a cache block specification line (e.g., 'cache(input variables)'). The execution engine 220 next receives an indication of an input variable of the cached bytecode (block 604). The indication of the variables may be determined automatically from the cache block specification line. Alternatively, a developer may specify names of the input variables for storage in the cache table entry. In some instances, the execution engine 220 may not specify a value for the input variable, instead leaving the value to be written the first time the cache block is accessed during runtime. In other instances, the developer may provide an input value or the execution engine 220 may already have the input value loaded at the time the cache table entry is created.

In this example, no output value corresponding to the input value exists such that the execution engine 220 has to execute the bytecode to determine an output variable value (block 606). In some instances where the cache table entry is automatically defined, the execution engine 220 may identify names of the output variables for storage in the cache table entry. After determining the output variables, the execution engine 220 is configured to store the input values, corresponding output values, any demarcation information to a newly created cache table entry (block 608). The execution engine 220 may also determine and store an identifier of the cached data block. The execution engine 220 then stores the cache table entry to the cache table (e.g., the cache table 218 of FIG. 3) (block 610). Alternatively, the execution engine 220 creates the cache table entry within the cache table first and then stores the demarcation information, input values, and output values. At this point, the cache table entry is created for a specified set of input variable value(s) and corresponding output variable value(s) and the example procedure 600 ends until another cache table entry is to be added to the cache table.

CONCLUSION

It will be appreciated that all of the disclosed methods and procedures described herein can be implemented using one or more computer programs or components. These components may be provided as a series of computer instructions on any computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A virtual machine apparatus comprising:
   a memory configured to store a cache file related to an application,
      the cache file having a cache table with a cache table entry that references a cache block that includes a selected portion of bytecode associated with the application,
      the cache table entry including (i) an identifier of the cache block, (ii) a demarcation of the selected portion of the bytecode of the application that is stored within the cache block, (iii) an input variable to the selected portion of the bytecode stored within the cache block, and (iv) an output variable of the selected portion of the bytecode stored within the cache block; and
   a virtual machine execution engine configured to read the bytecode of the application and execute instructions related to the bytecode, the execution engine configured to read the bytecode at least in part by:

reading the cache table to determine when to enter the cache block during execution of the bytecode, loading an execution input variable from the bytecode, determining if the execution input variable matches the input variable specified in the cache table entry, responsive to matching the execution input variable to the input variable of the cache block, determining if the output variable exists within the cache table entry, responsive to determining that the output variable exists, reading the output variable from the cache table entry and skipping execution of the selected portion of the bytecode stored within the cache block, storing the output variable to at least one of a heap and a stack related to the application, and executing another portion of the bytecode located after the selected portion of the bytecode stored within the cache block.

2. The virtual machine apparatus of claim 1, wherein the demarcation includes a beginning code line and an ending code line of the selected portion of the bytecode stored within the cache block relative to the bytecode of the application.

3. The virtual machine apparatus of claim 2, wherein skipping the execution of the selected portion of the bytecode stored within the cache block includes passing from the beginning code line of the bytecode to after the ending code line of the bytecode.

4. The virtual machine apparatus of claim 1, wherein skipping the execution of the selected portion of the bytecode stored within the cache block includes executing the cache table entry instead of selected portion of the bytecode stored within the cache block.

5. The virtual machine apparatus of claim 1, wherein determining if the execution input variable matches the input variable includes at least one of:

comparing a name of the execution input variable to a name of the input variable; and comparing a value of the execution input variable to a value of the input variable.

6. The virtual machine apparatus of claim 1, wherein the input variable includes at least one of a name of the input variable, a value of the input variable, a pattern, a hash of an object, and an attribute of an object.

7. The virtual machine apparatus of claim 1, wherein the output variable includes at least one of a name of the output variable, a value of the output variable, the stack position of the output variable, the heap position of the output variable, a name of an object field, and a value of an object field.

8. The virtual machine apparatus of claim 1, wherein the virtual machine includes a Java™ virtual machine and the bytecode includes Java™ bytecode.

9. A virtual machine apparatus comprising:

a virtual machine execution engine configured to:

load an input variable value in conjunction with starting execution of bytecode associated with an application, read a cache table entry stored in a cache file related to the application, the cache table entry including (i) a demarcation of a selected portion of the bytecode of the application that is stored within a cache block, (ii) a cache block input variable, and (iii) a cache block output variable, compare the loaded input variable value to the cache block input variable, and responsive to the loaded input variable value matching the cache block input variable:

skip execution of the selected portion of the bytecode, read the cache block output variable, and execute another portion of the bytecode located after the selected portion of the bytecode using the cache block output variable.

10. The virtual machine apparatus of claim 9, wherein the virtual machine execution engine is configured to, responsive to the input variable value not matching the cache block input variable, create a second cache table entry within the cache file that includes the input variable value and the same demarcation of a selected portion of the bytecode;

execute the selected portion of the bytecode to determine a second cache block output variable value; and store the second cache block output variable to the second cache table entry.

11. The virtual machine apparatus of claim 9, wherein the output variable includes a local variable object, and wherein the virtual machine execution engine is configured to:

load the output variable from the cache table entry by reading an expected position of the local variable object within a stack, determine a reference to an original of the local variable object using the expected position in the stack, de-serialize the local variable object, determine if a type of the original of the local variable object is the same as a type of the local variable object, and if the type of the original of the local variable object is the same as the type of the local variable object, rewrite a value of the original of the local variable object using a non-null value of the de-serialized local variable object.

12. The virtual machine apparatus of claim 9, wherein the output variable includes a primitive local variable, and wherein the virtual machine execution engine is configured to:

load the primitive local variable from the cache table entry by reading an expected position of the primitive local variable within a stack, verify a position of the primitive local variable within the stack using debug information, and if the position is verified, replace a value of the primitive local variable in the stack with a value of the primitive local variable within the cache table entry.

13. The virtual machine apparatus of claim 9, wherein the output variable includes a static value, and wherein the virtual machine execution engine is configured to:

search a heap that is related to the application for a static variable related to the static value, if the static variable is located, overwrite a value of the static variable with the static value, and if the static variable is not located, create the static variable on the heap and store the static value to the static variable.

14. The virtual machine apparatus of claim 9, wherein the output variable includes a field of an object having a primitive value, and wherein the virtual machine execution engine is configured to:

locate an object related to the field of the object, the field of the object including an object value, load a value of the field from the cache table entry, and replace the object value of the field of the object with the loaded value of the field from the cache table entry.

15. The virtual machine apparatus of claim 9, wherein the output variable includes a field of an object having an object, and wherein the virtual machine execution engine is configured to:

de-serialize the object, and rewrite a value of an original of the object using a non-null value of the de-serialized object.

16. A virtual machine apparatus comprising:

a virtual machine execution engine configured to:

read a cache table stored in a cache file related to an application specified by bytecode, the cache table including a plurality of cache table entries including (i) a demarcation of a selected portion of the bytecode that is stored within a cache block, the demarcation being the same for each of the cache table entries, (ii) a cache block input variable value, and (iii) a cache block output variable value, load an execution value from the bytecode that corresponds to a cache block input variable, query each of the cache table entries to determine whether the execution value matches the respective cache block input variable value, for the cache table entry with the matching cache block input variable value, determine the cache block output variable value, apply the cache block output variable value to at least one of a heap and a stack related to the application, and skip execution of the selected portion of the bytecode by executing another portion of the bytecode that is located after the selected portion of the bytecode stored within the cache block.

17. The virtual machine apparatus of claim 16, wherein each of the plurality of cache table entries includes a different cache block input variable value and a corresponding cache block output variable value that is determined from execution of the demarcation bytecode.

18. The virtual machine apparatus of claim 16, wherein the virtual machine execution engine is configured to, if no cache block output variable values exist for the execution value, create an additional cache table entry within the cache table that includes the execution value as the cache block input variable value and the demarcation of the bytecode of the application that is related to the cache block;

execute the bytecode related to the additional cache block to determine an additional cache block output variable value; and store the additional cache block output variable to the additional cache block.

19. The virtual machine apparatus of claim 16, wherein the virtual machine execution engine is configured to receive, from a developer, (i) the demarcation bytecode for storage within the cache block, and (ii) a cache block input variable name related to the cache block input variable value.

20. The virtual machine apparatus of claim 16, wherein the virtual machine execution engine is configured to determine during runtime of the application, the demarcation bytecode for storage within the cache block, the cache block input variable value, and the cache block output variable value.

* * * * *